US012639795B2

(12) United States Patent
Ishihara et al.

(10) Patent No.: US 12,639,795 B2
(45) Date of Patent: May 26, 2026

(54) DETECTION DEVICE AND DETECTION SYSTEM

(71) Applicant: Magnolia White Corporation, Tokyo (JP)

(72) Inventors: Tomoyuki Ishihara, Tokyo (JP); Yoshihiro Akahira, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 78 days.

(21) Appl. No.: 18/748,653

(22) Filed: Jun. 20, 2024

(65) Prior Publication Data

US 2024/0428383 A1 Dec. 26, 2024

(30) Foreign Application Priority Data

Jun. 22, 2023 (JP) ................................. 2023-102197

(51) Int. Cl.
*G06T 5/73* (2024.01)
*G06V 10/147* (2022.01)
*G06V 20/69* (2022.01)

(52) U.S. Cl.
CPC .............. *G06T 5/73* (2024.01); *G06V 10/147* (2022.01); *G06V 20/693* (2022.01); *G06T 2207/10056* (2013.01); *G06T 2207/30024* (2013.01)

(58) Field of Classification Search
CPC .............. G06T 5/73; G06T 2207/10056; G06T 2207/30024; G06V 10/147; G06V 20/693

USPC ............................................................ 348/79
See application file for complete search history.

(56) References Cited

U.S. PATENT DOCUMENTS

2023/0124060 A1* 4/2023 Xie ........................ G02B 21/36
348/79
2023/0213610 A1* 7/2023 Eberspach ........... G06V 40/166

FOREIGN PATENT DOCUMENTS

JP 2018-033430 A 3/2018

* cited by examiner

*Primary Examiner* — Sath V Perungavoor
*Assistant Examiner* — Kristin Dobbs
(74) *Attorney, Agent, or Firm* — K&L Gates LLP

(57) ABSTRACT

According to an aspect, a detection device includes: a light source; an optical sensor comprising a plurality of photo-diodes configured to output pixel data corresponding to amounts of light received by the photodiodes; a light-transmitting placement substrate that is configured to be placed between the light source and the optical sensor and includes a portion configured to have an object to be detected placed thereon; a storage circuit configured to store point spread function (PSF) data corresponding to a luminance gradient based on a positional relation between the light source and the object to be detected; and a control circuit configured to generate a restored image by performing a deconvolution process using the PSF data on an image obtained by imaging the object to be detected using the optical sensor based on light from the light source.

10 Claims, 11 Drawing Sheets

FIG.10

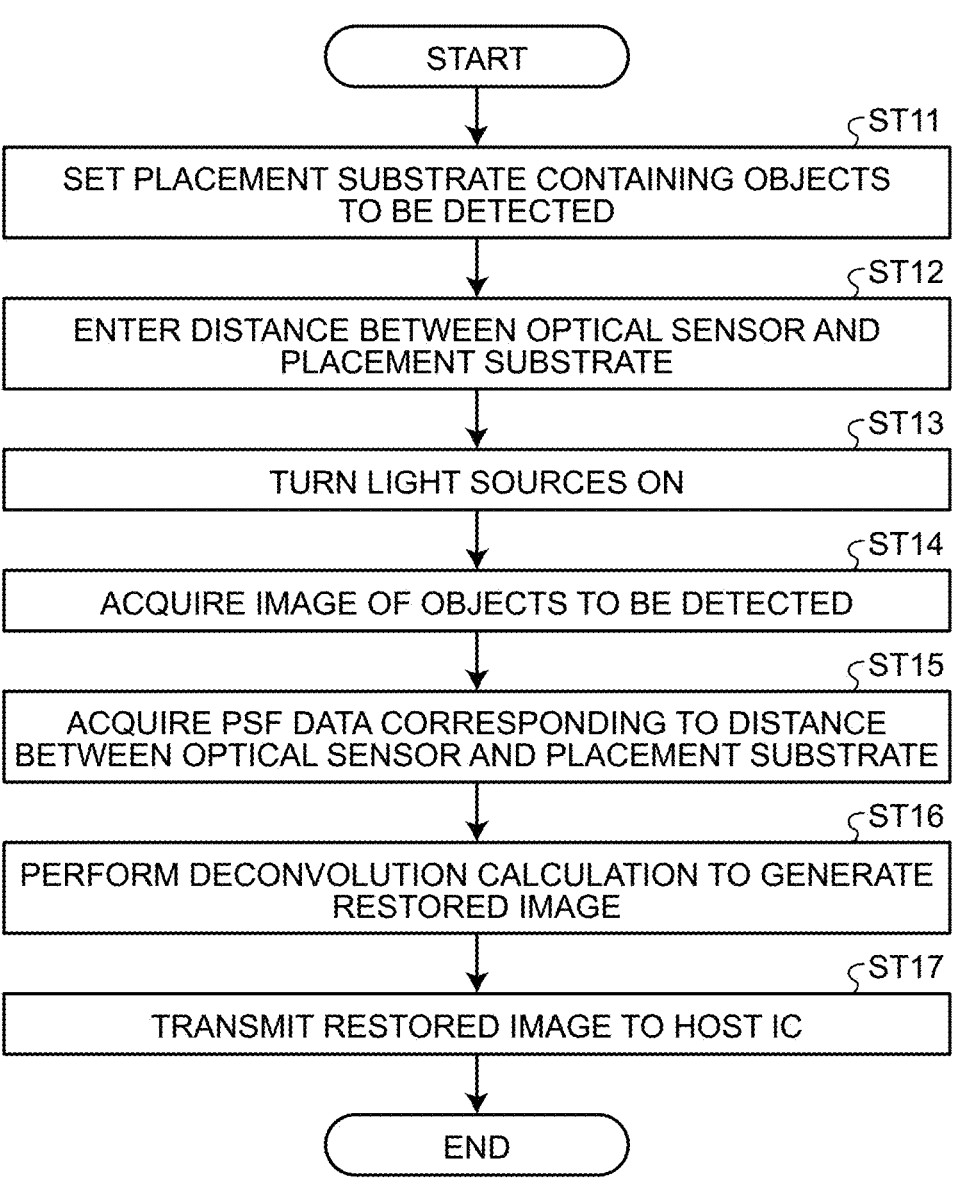

START

ST11

SET PLACEMENT SUBSTRATE CONTAINING OBJECTS
TO BE DETECTED

ST12

ENTER DISTANCE BETWEEN OPTICAL SENSOR AND
PLACEMENT SUBSTRATE

ST13

TURN LIGHT SOURCES ON

ST14

ACQUIRE IMAGE OF OBJECTS TO BE DETECTED

ST15

ACQUIRE PSF DATA CORRESPONDING TO DISTANCE
BETWEEN OPTICAL SENSOR AND PLACEMENT SUBSTRATE

ST16

PERFORM DECONVOLUTION CALCULATION TO GENERATE
RESTORED IMAGE

ST17

TRANSMIT RESTORED IMAGE TO HOST IC

END

DETECTION DEVICE AND DETECTION SYSTEM

CROSS-REFERENCE TO RELATED APPLICATION

This application claims the benefit of priority from Japanese Patent Application No. 2023-102197 filed on Jun. 22, 2023, the entire contents of which are incorporated herein by reference.

BACKGROUND

1. Technical Field

What is disclosed herein relates to a detection device and a detection system.

2. Description of the Related Art

Japanese Patent Application Laid-open Publication No. 2018-033430 (JP-A-2018-033430) discloses a biosensor that includes a photosensor, a culture vessel placed on top of an imaging surface of the photosensor, and a point light source disposed above the culture vessel. In the biosensor of JP-A-2018-033430, light emitted from the point light source passes through a culture medium and a plurality of objects to be detected (microbes), and enters the photosensor.

Such a detection device is required to detect the objects to be detected in a detection area having a larger area. When irradiating a larger area with one point light source, a larger distance is required between the point light source and an optical sensor (photosensor in JP-A-2018-033430), which makes an entire device larger in size. If a planar light source is used, the planar light source emits light in different directions to one object to be detected, which may blur an image captured by the optical sensor.

For the foregoing reasons, there is a need for a detection device and a detection system capable of improving the detection accuracy.

SUMMARY

According to an aspect, a detection device includes: a light source; an optical sensor comprising a plurality of photodiodes configured to output pixel data corresponding to amounts of light received by the photodiodes; a light-transmitting placement substrate that is configured to be placed between the light source and the optical sensor and includes a portion configured to have an object to be detected placed thereon; a storage circuit configured to store point spread function (PSF) data corresponding to a luminance gradient based on a positional relation between the light source and the object to be detected; and a control circuit configured to generate a restored image by performing a deconvolution process using the PSF data on an image obtained by imaging the object to be detected using the optical sensor based on light from the light source.

According to an aspect, a detection system includes: a detection device; and a host integrated circuit (IC) configured to perform image processing on an image captured by the detection device. The detection device includes: a light source; an optical sensor comprising a plurality of photodiodes configured to output pixel data corresponding to amounts of light received by the photodiodes; a light-transmitting placement substrate that is configured to be placed between the light source and the optical sensor and comprises a portion configured to have an object to be detected placed thereon; a storage circuit configured to store point spread function (PSF) data corresponding to a luminance gradient based on a positional relation between the light source and the object to be detected; and a control circuit configured to transmit, to the host IC, an image obtained by imaging the object to be detected using the optical sensor based on light from the light source. The host IC is configured to generate a restored image by performing a deconvolution process using the PSF data on the image received from the detection device, the image having been obtained by imaging the object to be detected.

BRIEF DESCRIPTION OF THE DRAWINGS

FIG. 10 is a flowchart illustrating the method to generate the restored image by the detection device according to the first embodiment;

DETAILED DESCRIPTION

Figure 1:
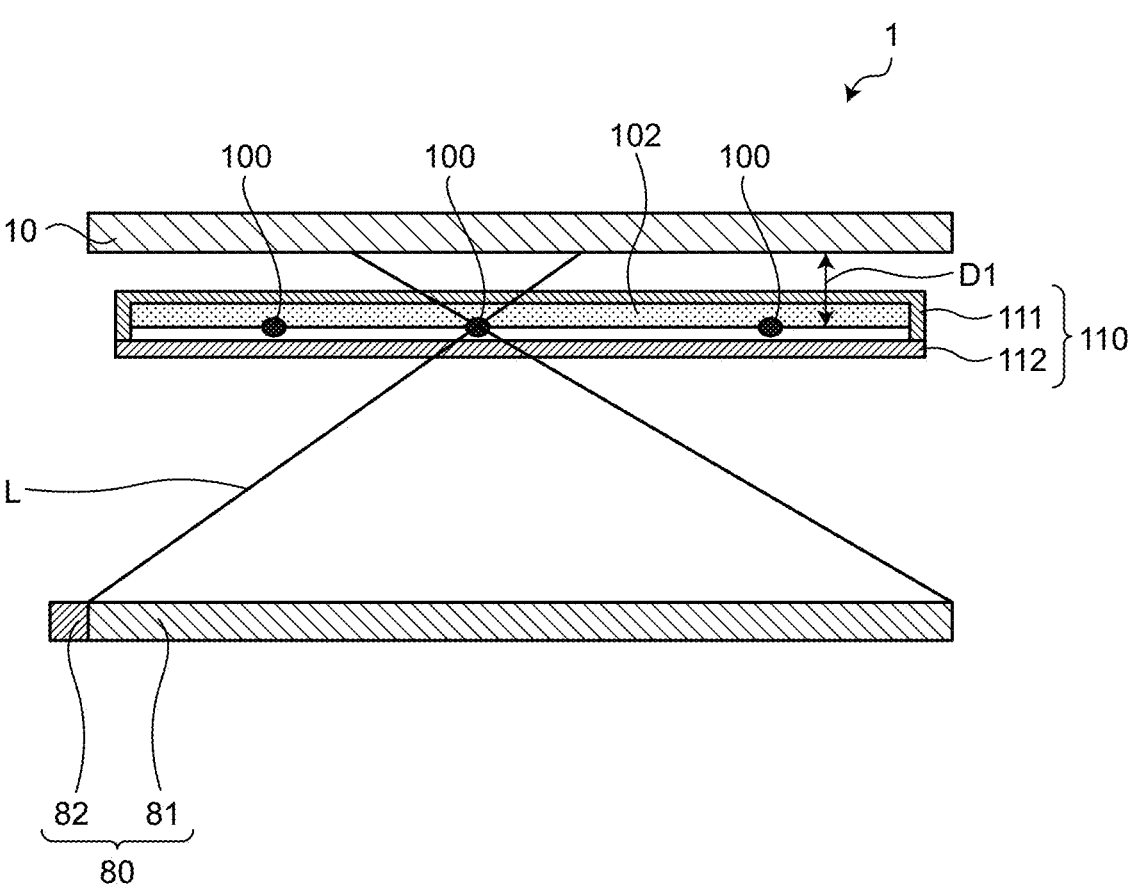
FIG. 1 is a sectional view schematically illustrating a detection device according to a first embodiment.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

FIG. 1 is a sectional view schematically illustrating a detection device according to a first embodiment. As illustrated in FIG. 1, a detection device 1 includes an optical sensor 10, a placement substrate 110 having a portion configured to have objects to be detected 100 placed thereon, and a light source device 80. In the detection device 1, the light source device 80, the placement substrate 110 (the objects to be detected 100 and a culture medium 102), and the optical sensor 10 are disposed in this order.

The objects to be detected 100 are micro-objects such as bacteria. The detection device 1 is a biosensor that detects the micro-objects such as the bacteria. The objects to be detected 100 are not limited to the bacteria, but may be other micro-objects such as cells.

The placement substrate 110 is a light-transmitting container made of glass, for example. The placement substrate 110 includes a container body 111 and a cover member 112. The placement substrate 110 is a Petri dish, for example. In the present embodiment, the placement substrate 110 is placed upside down with respect to a normal container. That is, the normal container is placed with its container body on the lower side and its cover member on the upper side. In contrast, the placement substrate 110 according to the present embodiment is placed with the container body 111 on the upper side and the cover member 112 on the lower side. The container body 111 contains the culture medium 102, and the objects to be detected 100 are cultured in the culture medium 102. Specifically, the objects to be detected 100 such as the bacteria are placed on the upper side of the culture medium 102 and cultured, and when imaging the objects to be detected 100, the placement substrate 110 is placed upside down to place the objects to be detected 100 on the lower side of the culture medium 102. The objects to be detected 100 serving as detection targets and the culture medium 102 are contained in the placement substrate 110, and the placement substrate 110 is placed between the optical sensor 10 and the light source device 80.

With the normal placement of the container, water vapor is generated from the culture medium and moves upward, which may cause beads of water to adhere to the cover member. In this case, light from the light source may become noise as it passes through the beads of water, whereby an image obtained via the optical sensor may be distorted. In the present embodiment, the placement substrate 110 is placed such that the cover member 112 is placed on the lower side, whereby the beads of water are difficult to adhere to the cover member 112, and thus the generation of the noise is reduced. The placement substrate 110 is held by a support member (not illustrated) and lifted up by an elastic member such as a spring (not illustrated).

The optical sensor 10 is a planar detection device that includes a plurality of photodiodes 30 (photodetection elements) arranged in a planar configuration. A detailed configuration of the optical sensor 10 will be described later with reference to FIG. 2 and FIGS. 5 and 6.

The light source device 80 includes a light guide plate 81 and a light source 82. The light guide plate 81 is a plate-like member disposed so as to face a detection area AA of the optical sensor 10. The light source 82 is disposed on a side surface of the light guide plate 81. The light source 82 includes a light-emitting diode (LED), for example. Although FIG. 1 illustrates one light source 82, a plurality of the light sources 82 may be arranged along the side surface of the light guide plate 81.

Light emitted from the light source 82 travels from one side to the other side of the light guide plate 81 while being repeatedly totally reflected on the upper surface and the lower surface of the light guide plate 81. Part of the light traveling in the light guide plate 81 is then output from the upper surface. As a result, planar light L is output from the light guide plate 81 of the light source device 80 toward the optical sensor 10. The light L passes through the placement substrate 110 (container body 111 and cover member 112), the culture medium 102, and the objects to be detected 100, and is emitted toward the photodiodes 30 of the optical sensor 10. The amounts of light received by the photodiodes 30 differ between areas overlapping the objects to be detected 100 and areas not overlapping the objects to be detected 100. As a result, the optical sensor 10 can image the objects to be detected 100.

In the present embodiment, the light guide plate 81 and the light source 82 are configured as a planar light source. This configuration allows the light L to be irradiated onto a wider area than in a case where a point light source is provided. Therefore, the optical sensor 10 can simultaneously image the objects to be detected 100 in the wider detection area AA. However, when focusing on one of the objects to be detected 100, the light L in different directions is irradiated onto the object to be detected 100 from within the plane of the light guide plate 81, and the image of the object to be detected 100 projected on the surface of the optical sensor 10 has been spread with respect to the actual shape (area) of the object to be detected 100.

Figure 2:
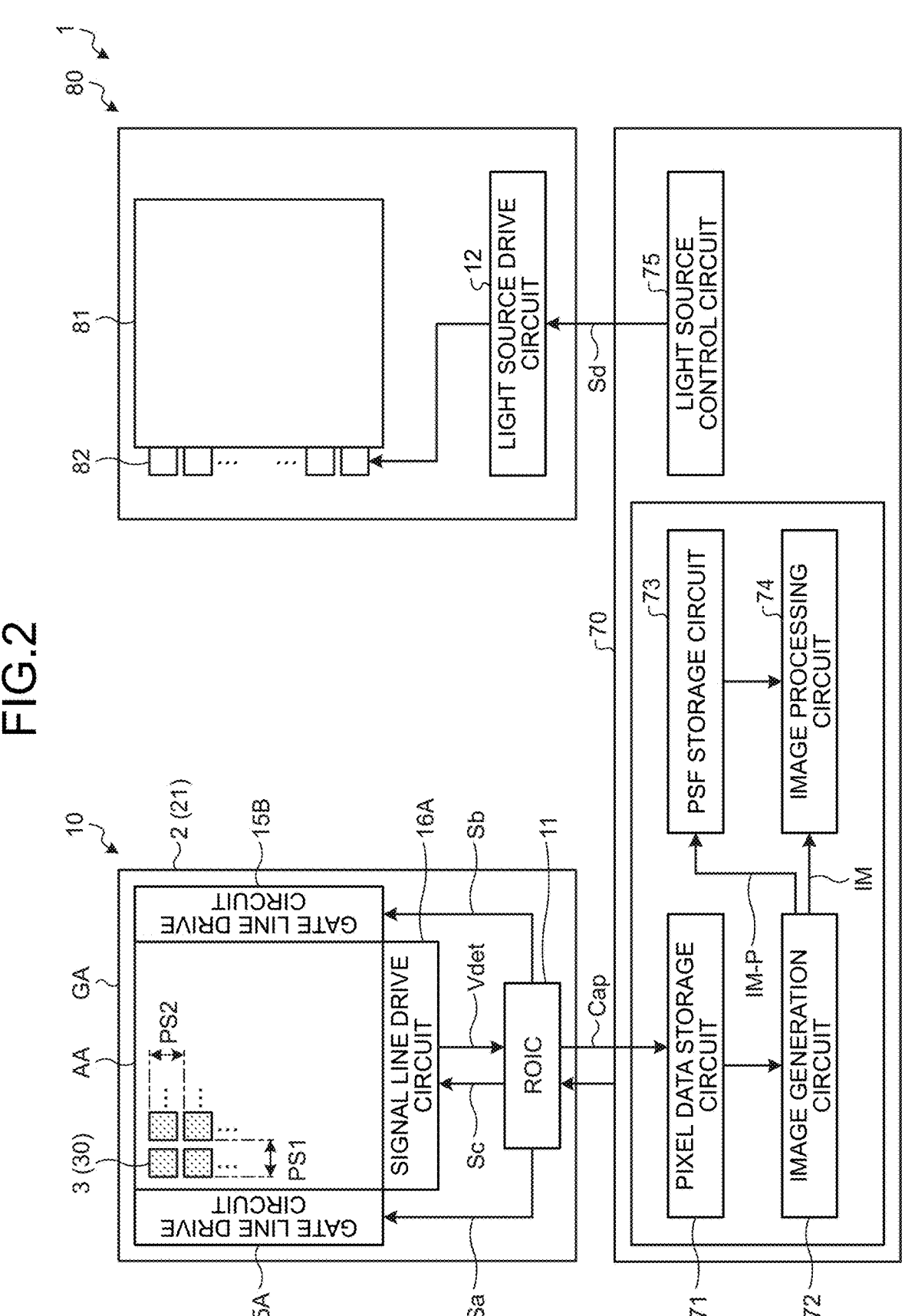
FIG. 2 is a block diagram illustrating a configuration example of the detection device according to the first embodiment.

FIG. 2 is a block diagram illustrating a configuration example of the detection device according to the first embodiment. As illustrated in FIG. 2, the detection device 1 further includes a control circuit 70 that controls the optical sensor 10 and the light source device 80. The control circuit 70 synchronously (or non-synchronously) controls an operation of detecting the objects to be detected 100 by the optical sensor 10 and a lighting operation of the light source 82 by the light source device 80. The control circuit 70 includes, for example, a micro control unit (MCU), a random-access memory (RAM), an electrically erasable programmable read-only memory (EEPROM), and a read-only memory (ROM).

The optical sensor 10 includes an array substrate 2, a plurality of sensor pixels 3 (photodiodes 30) formed on the array substrate 2, gate line drive circuits 15A and 15B, a signal line drive circuit 16A, and a detection circuit 11.

The array substrate 2 is formed using a substrate 21 as a base. Each of the sensor pixels 3 is configured with a corresponding one of the photodiodes 30, a plurality of transistors, and various types of wiring. The array substrate 2 with the photodiodes 30 formed thereon is a drive circuit board for driving the sensor for each predetermined detection area and is also called a backplane or an active matrix substrate.

The substrate 21 has the detection area AA and a peripheral area GA. The detection area AA is an area provided with the sensor pixels 3 (photodiodes 30). The peripheral area GA is an area between the outer perimeter of the detection area AA and the outer edges of the substrate 21 and is an area not provided with the sensor pixels 3. The gate line drive circuits 15A and 15B, the signal line drive circuit 16A, and the detection circuit 11 are provided in the peripheral area GA.

Each of the sensor pixels 3 is an optical sensor including the photodiode 30 as a sensor element. Each of the photodiodes 30 outputs an electric signal corresponding to light emitted thereto. More specifically, the photodiode 30 is a positive-intrinsic-negative (PIN) photodiode or an organic photodiode (OPD) using an organic semiconductor. The sensor pixels 3 (photodiodes 30) are arranged in a matrix having a row-column configuration in the detection area AA.

The detection circuit 11 is a circuit that supplies control signals Sa, Sb, and Sc to the gate line drive circuits 15A and 15B, and the signal line drive circuit 16A, respectively, to control operations of these circuits. Specifically, the gate line drive circuits 15A and 15B output gate drive signals to gate lines GLS (refer to FIG. 4) based on the control signals Sa and Sb. The signal line drive circuit 16A electrically couples a signal line SLS selected based on the control signal Sc to the detection circuit 11. The detection circuit 11 includes a signal processing circuit that performs signal processing on a detection signal Vdet from each of the photodiodes 30.

The photodiodes 30 included in the sensor pixels 3 perform detection in response to the gate drive signals supplied from the gate line drive circuits 15A and 15B. Each of the photodiodes 30 outputs the electric signal corresponding to the light emitted thereto as the detection signal Vdet to the signal line drive circuit 16A. The detection circuit 11 is electrically coupled to the photodiodes 30. The detection circuit 11 performs the signal processing on the detection signal Vdet from each of the photodiodes 30 and outputs pixel data Cap based on the detection signal Vdet to the control circuit 70. The pixel data Cap is a sensor value obtained for each of the sensor pixels 3. In this way, the detection device 1 detects information on the objects to be detected 100.

Figure 3:
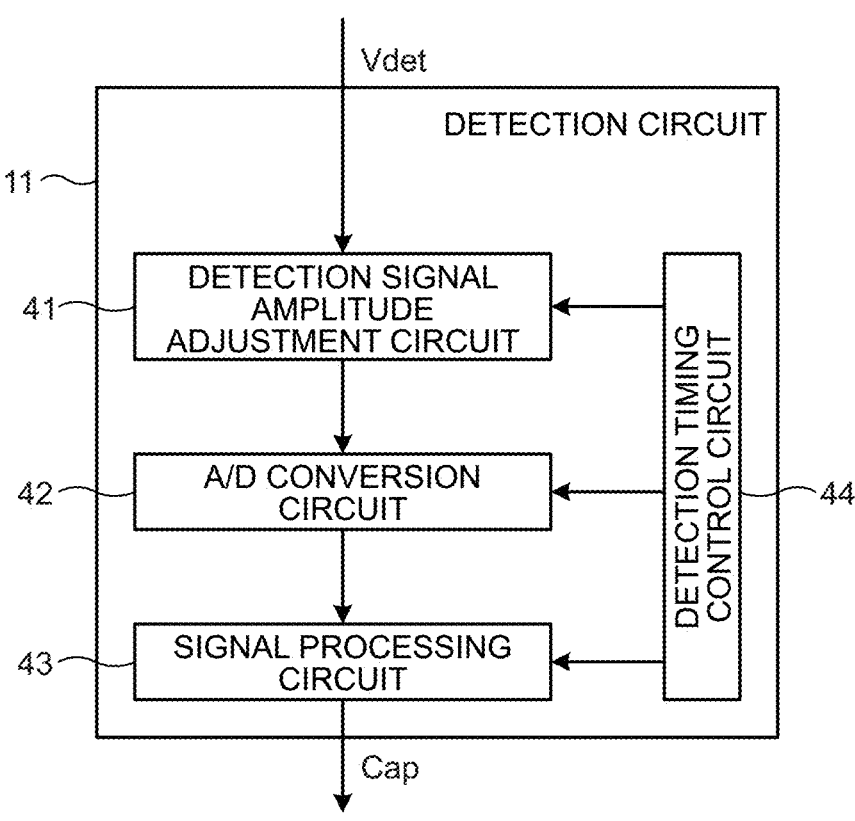
FIG. 3 is a block diagram illustrating a configuration example of a detection circuit according to the first embodiment.

FIG. 3 is a block diagram illustrating a configuration example of the detection circuit according to the first embodiment. As illustrated in FIG. 3, the detection circuit 11 includes a detection signal amplitude adjustment circuit 41, an analog-to-digital (A/D) conversion circuit 42, a signal processing circuit 43, and a detection timing control circuit 44. In the detection circuit 11, the detection timing control circuit 44 performs control to cause the detection signal amplitude adjustment circuit 41, the A/D conversion circuit 42, and the signal processing circuit 43 to operate in synchronization with one another based on a control signal supplied from the control circuit 70 (refer to FIG. 2).

The detection signal amplitude adjustment circuit 41 is a circuit that adjusts the amplitude of the detection signal Vdet output from the photodiode 30 and is configured with an amplifier, for example. The A/D conversion circuit 42 converts analog signals output from the detection signal amplitude adjustment circuit 41 into digital signals. The signal processing circuit 43 is a circuit that performs signal processing on the digital signals from the A/D conversion circuit 42 and transmits the pixel data Cap to the control circuit 70.

Referring back to FIG. 2, the light source device 80 includes the light guide plate 81, the light sources 82, and a light source drive circuit 12. The light guide plate 81 is located in an area overlapping the detection area AA of the optical sensor 10. The light sources 82 are arranged along one side of the light guide plate 81. The light source drive circuit 12 supplies drive signals to the light sources 82 based on control signals from a light source control circuit 75 of the control circuit 70. The light sources 82 are switched on (lit) or off (unlit) based on control signals from the control circuit 70 (light source control circuit 75).

The number and arrangement of the light sources 82 can be changed as appropriate. For example, the light sources 82 are not limited to the configuration of being provided along one side of the light guide plate 81, and may be provided along a plurality of sides of the light guide plate 81.

The control circuit 70 includes a pixel data storage circuit 71, an image generation circuit 72, a point spread function (PSF) storage circuit 73, and an image processing circuit 74 as control circuits for the optical sensor 10. The pixel data storage circuit 71 stores therein the pixel data Cap output from the detection circuit 11 of the optical sensor 10. Based on the pixel data Cap of the photodiodes 30, the image generation circuit 72 generates an image IM obtained by imaging the objects to be detected 100.

The PSF storage circuit 73 stores therein PSF data (spread function) acquired based on an image IM-P obtained by imaging a pinhole plate 50 (refer to FIG. 8) or a small light-blocking point using the optical sensor 10 based on the light from the light sources 82. The PSF data is data corresponding to a luminance gradient based on the positional relation between the light sources 82 and the object to be detected 100. In more detail, the PSF data may be a two-dimensional distribution of luminance data indicating the luminance gradient or may be a function expression of the distance between the center point of the two-dimensional distribution of the luminance data and each of the surrounding pixels.

The image processing circuit 74 generates a restored image IM-R by performing a deconvolution process using the PSF data on the image IM obtained by imaging the objects to be detected 100 using the optical sensor 10 based on the light L from the light sources 82. This process allows the detection device 1 of the present embodiment to generate an image with reduced blurring by generating the restored image IM-R by performing the deconvolution process on the image IM of the object to be detected 100 that has been captured in a spreading manner. The deconvolution process in the control circuit 70 will be described later with reference to FIG. 7 and the subsequent drawings.

The control circuit 70 includes the light source control circuit 75 as a control circuit for the light source device 80. The light source control circuit 75 controls the lighting of the light sources 82 in synchronization with the detection operation of the optical sensor 10. The light source control circuit 75 stores therein information on amounts of light, lighting periods, and lighting patterns of the light sources 82 as needed, and transmits control signals according to these information items to the light source device 80 (light source drive circuit 12).

The optical sensor 10 includes the two gate line drive circuits 15A and 15B, but may include one gate line drive circuit. The light source device 80 includes the light source drive circuit 12, but the light source drive circuit 12 may be provided in the control circuit 70.

Figure 4:
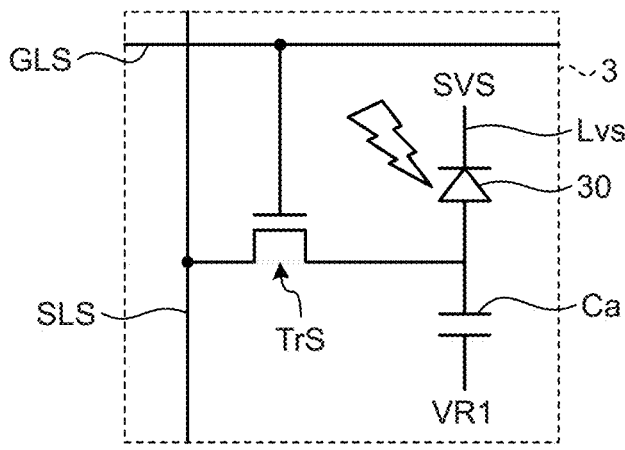
FIG. 4 is a circuit diagram illustrating a sensor pixel.

The following describes a configuration example of the optical sensor 10. FIG. 4 is a circuit diagram illustrating the sensor pixel. As illustrated in FIG. 4, the sensor pixel 3 includes the photodiode 30, a capacitive element Ca, and a transistor TrS. The transistor TrS is provided correspondingly to the photodiode 30. The transistor TrS is formed of a thin-film transistor, and in this example, formed of an n-channel metal oxide semiconductor (MOS) thin-film transistor (TFT). The gate of the transistor TrS is coupled to the gate line GLS. The source of the transistor TrS is coupled to the signal line SLS. The drain of the transistor TrS is coupled to the anode of the photodiode 30 and the capacitive element Ca.

The cathode of the photodiode 30 is supplied with a power supply potential SVS from the detection circuit 11. The capacitive element Ca is supplied with a reference potential VR1 serving as an initial potential of the capacitive element Ca from the detection circuit 11.

When the sensor pixel 3 is irradiated with light, a current corresponding to the amount of the light flows through the photodiode 30. As a result, an electric charge is stored in the capacitive element Ca. Turning on the transistor TrS causes a current corresponding to the electric charge stored in the capacitive element Ca to flow through the signal line SLS. The signal line SLS is coupled to the detection circuit 11 through the signal line drive circuit 16A. Thus, the optical sensor 10 of the detection device 1 can detect a signal corresponding to the amount of the light received by the photodiode 30 for each of the sensor pixels 3.

The transistor TrS is not limited to the n-type TFT and may be configured as a p-type TFT. The pixel circuit of the sensor pixel 3 illustrated in FIG. 4 is merely exemplary. The sensor pixel 3 may be provided with a plurality of transistors corresponding to one photodiode 30.

Figure 5:
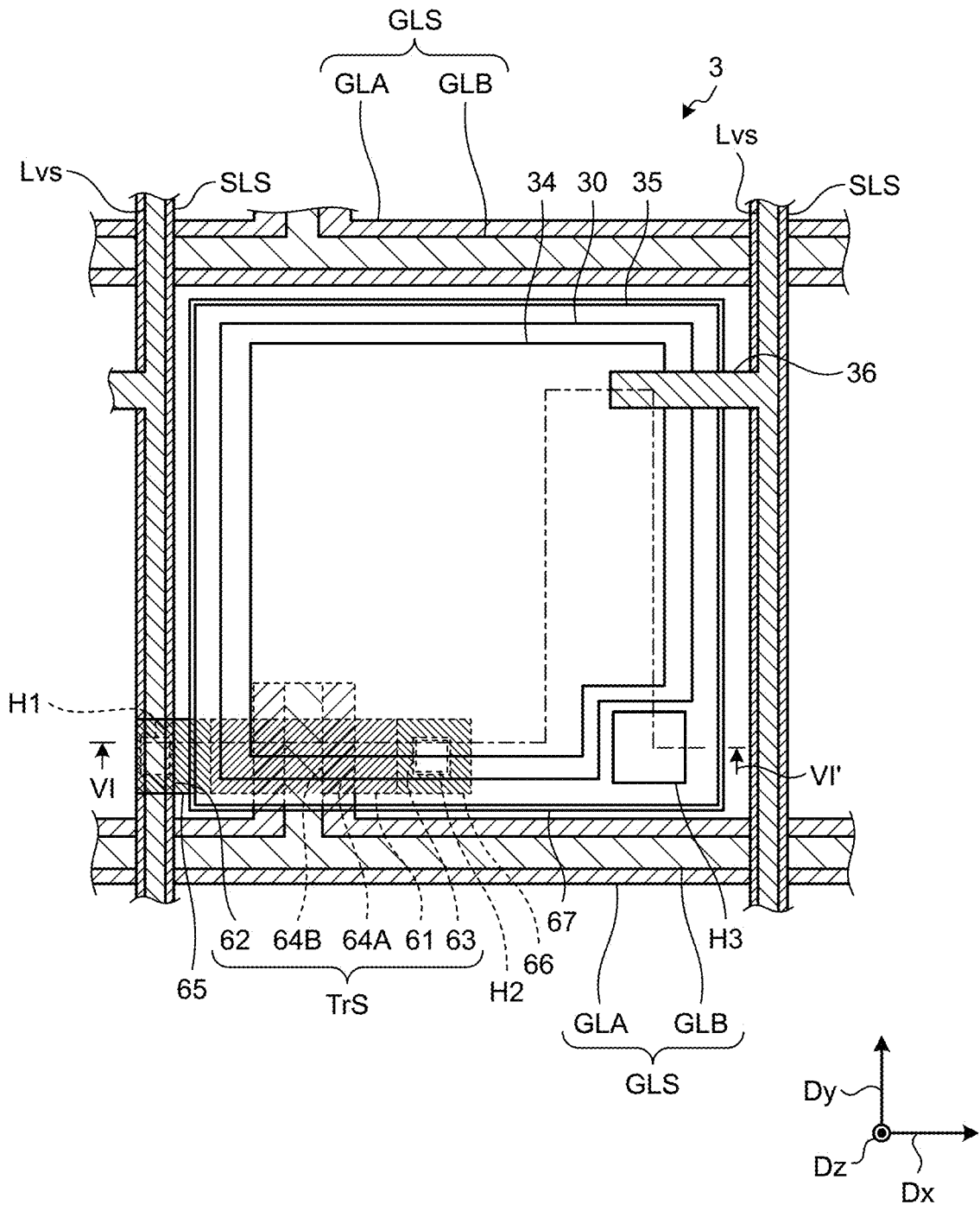
FIG. 5 is a plan view schematically illustrating the sensor pixel according to the first embodiment.

The following describes a detailed configuration of the optical sensor 10. FIG. 5 is a plan view schematically illustrating the sensor pixel according to the first embodiment.

In the following description, a first direction Dx is one direction in a plane parallel to the substrate 21 (refer to FIG. 6). A second direction Dy is one direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy and is a direction normal to a principal surface of the substrate 21. The term "plan view" refers to a positional relation when viewed in a direction orthogonal to the substrate 21.

As illustrated in FIG. 5, the sensor pixel 3 is an area surrounded by the gate lines GLS and the signal lines SLS. In the present embodiment, the gate line GLS includes a first gate line GLA and a second gate line GLB. The first gate line GLA is provided so as to overlap the second gate line GLB. The first and the second gate lines GLA and GLB are provided in different layers with insulating layers 22c and 22d (refer to FIG. 6) interposed therebetween. The first and the second gate lines GLA and GLB are electrically coupled together at any point and are supplied with the gate drive signals having the same potential. At least one of the first gate line GLA and the second gate line GLB is coupled to the gate line drive circuits 15A and 15B. In FIG. 5, the first and the second gate lines GLA and GLB have different widths, but may have the same width.

The photodiode 30 is provided in the area surrounded by the gate lines GLS and the signal lines SLS. An upper electrode 34 and a lower electrode 35 are provided for each of the photodiodes 30. The photodiode 30 is a PIN photodiode, for example. The lower electrode 35 is, for example, an anode electrode of the photodiode 30. The upper electrode 34 is, for example, a cathode electrode of the photodiode 30.

The upper electrode 34 is coupled to a power supply signal line Lvs through coupling wiring 36. The power supply signal line Lvs is wiring that supplies the power supply potential SVS to the photodiode 30. In the present embodiment, the power supply signal line Lvs extends in the second direction Dy while overlapping the signal line SLS. The sensor pixels 3 arranged in the second direction Dy are coupled to the power supply signal line Lvs that is shared by those sensor pixels 3. Such a configuration can enlarge an opening for the sensor pixel 3. The lower electrode 35, the photodiode 30, and the upper electrode 34 are substantially quadrilateral in plan view. However, the shapes of the lower electrode 35, the photodiode 30, and the upper electrode 34 are not limited thereto and can be changed as appropriate.

The transistor TrS is provided near an intersection between the gate line GLS and the signal line SLS. The transistor TrS includes a semiconductor layer 61, a source electrode 62, a drain electrode 63, a first gate electrode 64A, and a second gate electrode 64B.

The semiconductor layer 61 is an oxide semiconductor. The semiconductor layer 61 is more preferably a transparent amorphous oxide semiconductor (TAOS) among types of the oxide semiconductor. Using the oxide semiconductor as the transistor TrS can reduce a leakage current of the transistor TrS. That is, the transistor TrS can reduce the leakage current from the sensor pixel 3 that is not selected. Therefore, the optical sensor 10 can improve the signal-to-noise ratio (S/N). The semiconductor layer 61 is, however, not limited thereto, and may be formed of, for example, a microcrystalline oxide semiconductor, an amorphous oxide semiconductor, polysilicon, or low-temperature polycrystalline silicon (LTPS).

The semiconductor layer 61 is provided along the first direction Dx and intersects the first and the second gate electrodes 64A and 64B in plan view. The first and the second gate electrodes 64A and 64B are provided so as to branch from the first and the second gate lines GLA and GLB. In other words, portions of the first and the second gate lines GLA and GLB that overlap the semiconductor layer 61 serve as the first and the second gate electrodes 64A and 64B. Aluminum (Al), copper (Cu), silver (Ag), molybdenum (Mo), or an alloy of these metals is used for the first and the second gate electrodes 64A and 64B. A channel region is formed at a portion of the semiconductor layer 61 that overlaps the first and the second gate electrodes 64A and 64B.

One end of the semiconductor layer 61 is coupled to the source electrode 62 through a contact hole H1. The other end of the semiconductor layer 61 is coupled to the drain electrode 63 through a contact hole H2. A portion of the signal line SLS that overlaps the semiconductor layer 61 serves as the source electrode 62. A portion of a third conductive layer 67 that overlaps the semiconductor layer 61 serves as the drain electrode 63. The third conductive layer 67 is coupled to the lower electrode 35 through a contact hole H3. Such a configuration allows the transistor TrS to switch between coupling and decoupling between the photodiode 30 and the signal line SLS.

The following describes a layer configuration of the optical sensor 10. FIG. 6 is a sectional view taken along line VI-VI' of FIG. 5.

In the description of the detection device 1 that includes the optical sensor 10, a direction from the substrate 21 toward the photodiode 30 in a direction (third direction Dz) orthogonal to a surface of the substrate 21 is referred to as "upper side" or "above". A direction from the photodiode 30 toward the substrate 21 is referred to as "lower side" or "below".

Figure 6:
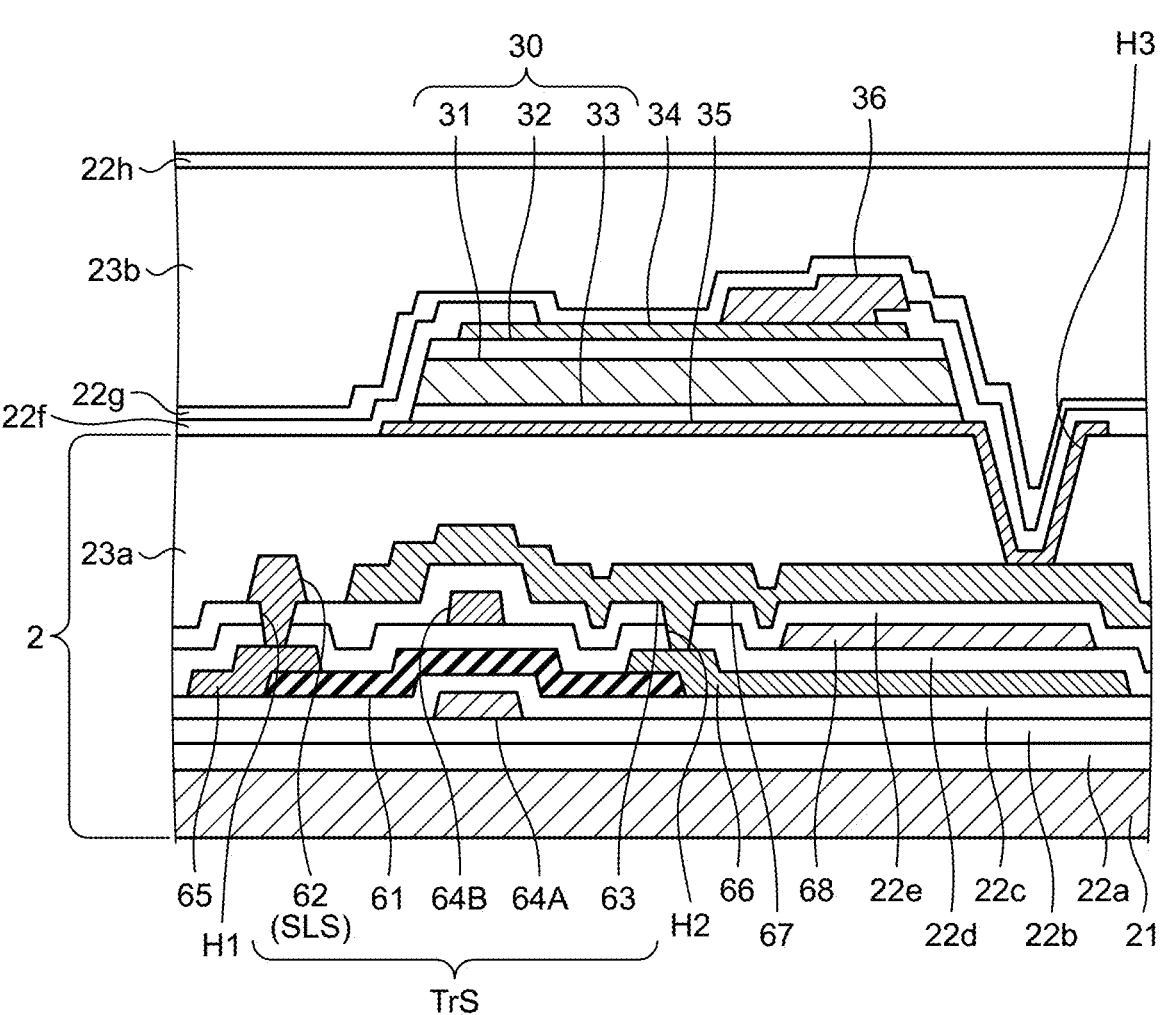
FIG. 6 is a sectional view taken along line VI-VI' in FIG. 5.

The substrate 21 illustrated in FIG. 6 is an insulating substrate, and is made using, for example, a glass substrate of quartz, alkali-free glass, or the like. The transistors TrS, various types of wiring (gate lines GLS and signal lines SLS), and insulating layers are provided on one surface side of the substrate 21 to form the array substrate 2. The photodiodes 30 are arranged on the upper side of the array substrate 2, that is, on the one surface side of the substrate 21. The substrate 21 may be a resin substrate or a resin film made of a resin such as polyimide.

Insulating layers 22a and 22b are provided on the substrate 21. Insulating layers 22a, 22b, 22c, 22d, 22e, 22f, and 22g are inorganic insulating films of, for example, silicon oxide ($SiO_2$) or silicon nitride (SiN). Each of the inorganic insulating layers is not limited to a single layer and may be a multilayered film.

The first gate electrode 64A is provided above the insulating layer 22b. The insulating layer 22c is provided on the insulating layer 22b so as to cover the first gate electrode 64A. The semiconductor layer 61, a first conductive layer 65, and a second conductive layer 66 are provided on the insulating layer 22c. The first conductive layer 65 is provided so as to cover an end of the semiconductor layer 61 coupled to the source electrode 62. The second conductive layer 66 is provided so as to cover an end of the semiconductor layer 61 coupled to the drain electrode 63.

The insulating layer 22d is provided on the insulating layer 22c so as to cover the semiconductor layer 61, the first conductive layer 65, and the second conductive layer 66. The second gate electrode 64B is provided on the insulating layer 22d. The semiconductor layer 61 is provided between the first gate electrode 64A and the second gate electrode 64B in the direction orthogonal to the substrate 21. That is, the transistor TrS has what is called a dual-gate structure. The transistor TrS may, however, have a bottom-gate structure that is provided with the first gate electrode 64A and not provided with the second gate electrode 64B, or a top-gate structure that is not provided with the first gate electrode 64A and provided with only the second gate electrode 64B.

The insulating layer 22e is provided on the insulating layer 22d so as to cover the second gate electrode 64B. The source electrode 62 (signal line SLS) and the drain electrode 63 (third conductive layer 67) are provided on the insulating layer 22e. In the present embodiment, the drain electrode 63 is the third conductive layer 67 provided above the semiconductor layer 61 with the insulating layers 22d and 22e interposed therebetween. The source electrode 62 is electrically coupled to the semiconductor layer 61 through the contact hole H1 and the first conductive layer 65. The drain electrode 63 is electrically coupled to the semiconductor layer 61 through the contact hole H2 and the second conductive layer 66.

The third conductive layer 67 is provided in an area overlapping the photodiode 30 in plan view. The third conductive layer 67 is provided also on the upper side of the semiconductor layer 61 and the first and the second gate electrodes 64A and 64B. That is, the third conductive layer 67 is provided between the second gate electrode 64B and the lower electrode 35 in the direction orthogonal to substrate 21. With this configuration, the third conductive layer 67 has a function as a protective layer that protects the transistor TrS.

The second conductive layer 66 extends so as to face the third conductive layer 67 in an area not overlapping the semiconductor layer 61. A fourth conductive layer 68 is provided on the insulating layer 22d in the area not overlapping the semiconductor layer 61. The fourth conductive layer 68 is provided between the second conductive layer 66 and the third conductive layer 67. This configuration generates capacitance between the second conductive layer 66 and the fourth conductive layer 68, and capacitance between the third conductive layer 67 and the fourth conductive layer 68. The capacitance generated by the second conductive layer 66, the third conductive layer 67, and the fourth conductive layer 68 serves as capacitance of the capacitive element Ca illustrated in FIG. 4.

A first organic insulating layer 23a is provided on the insulating layer 22e so as to cover the source electrode 62 (signal line SLS) and the drain electrode 63 (third conductive layer 67). The first organic insulating layer 23a is a planarizing layer that planarizes asperities formed by the transistor TrS and various conductive layers.

The following describes a sectional configuration of the photodiode 30. The lower electrode 35, the photodiode 30, and the upper electrode 34 are stacked in this order on the first organic insulating layer 23a of the array substrate 2.

The lower electrode 35 is provided on the first organic insulating layer 23a and is electrically coupled to the third conductive layer 67 through the contact hole H3. The lower electrode 35 is the anode of the photodiode 30 and is an electrode for reading the detection signal Vdet. For example, a metal material such as molybdenum (Mo) or aluminum (Al) is used for the lower electrode 35. The lower electrode 35 may alternatively be a multilayered film formed of a plurality of layers of these metal materials. The lower electrode 35 may be formed of a light-transmitting conductive material such as indium tin oxide (ITO) or indium zinc oxide (IZO).

The photodiode 30 includes an i-type semiconductor layer 31, an n-type semiconductor layer 32, and a p-type semiconductor layer 33 as semiconductor layers. The i-type semiconductor layer 31, the n-type semiconductor layer 32, and the p-type semiconductor layer 33 are formed of amorphous silicon (a-Si), for example. In FIG. 6, the p-type semiconductor layer 33, the i-type semiconductor layer 31, and the n-type semiconductor layer 32 are stacked in this order in the direction orthogonal to the surface of the substrate 21. However, the photodiode 30 may have a reversed configuration. That is, the n-type semiconductor layer 32, the i-type semiconductor layer 31, and the p-type semiconductor layer 33 may be stacked in this order. Each of the semiconductor layers may be a photoelectric conversion element formed of an organic semiconductor.

The a-Si of the n-type semiconductor layer 32 is doped with impurities to form an n+ region. The a-Si of the p-type semiconductor layer 33 is doped with impurities to form a p+ region. The i-type semiconductor layer 31 is, for example, a non-doped intrinsic semiconductor, and has lower conductivity than that of the n-type semiconductor layer 32 and the p-type semiconductor layer 33.

The upper electrode 34 is the cathode of the photodiode 30 and is an electrode for supplying the power supply potential SVS to photoelectric conversion layers. The upper electrode 34 is, for example, a light-transmitting conductive layer of, for example, ITO, and a plurality of the upper electrodes 34 are provided for the respective photodiodes 30.

The insulating layers 22f and 22g are provided on the first organic insulating layer 23a. The insulating layer 22f covers the periphery of the upper electrode 34 and is provided with an opening in a position overlapping the upper electrode 34. The coupling wiring 36 is coupled to a portion of the upper electrode 34 not provided with the insulating layer 22f. The insulating layer 22g is provided on the insulating layer 22f so as to cover the upper electrode 34 and the coupling wiring 36. A second organic insulating layer 23b serving as a planarizing layer is provided on the insulating layer 22g. If the photodiode 30 is made of an organic semiconductor, an insulating layer 22h may be further provided on the upper side of the photodiode 30.

Figure 7:
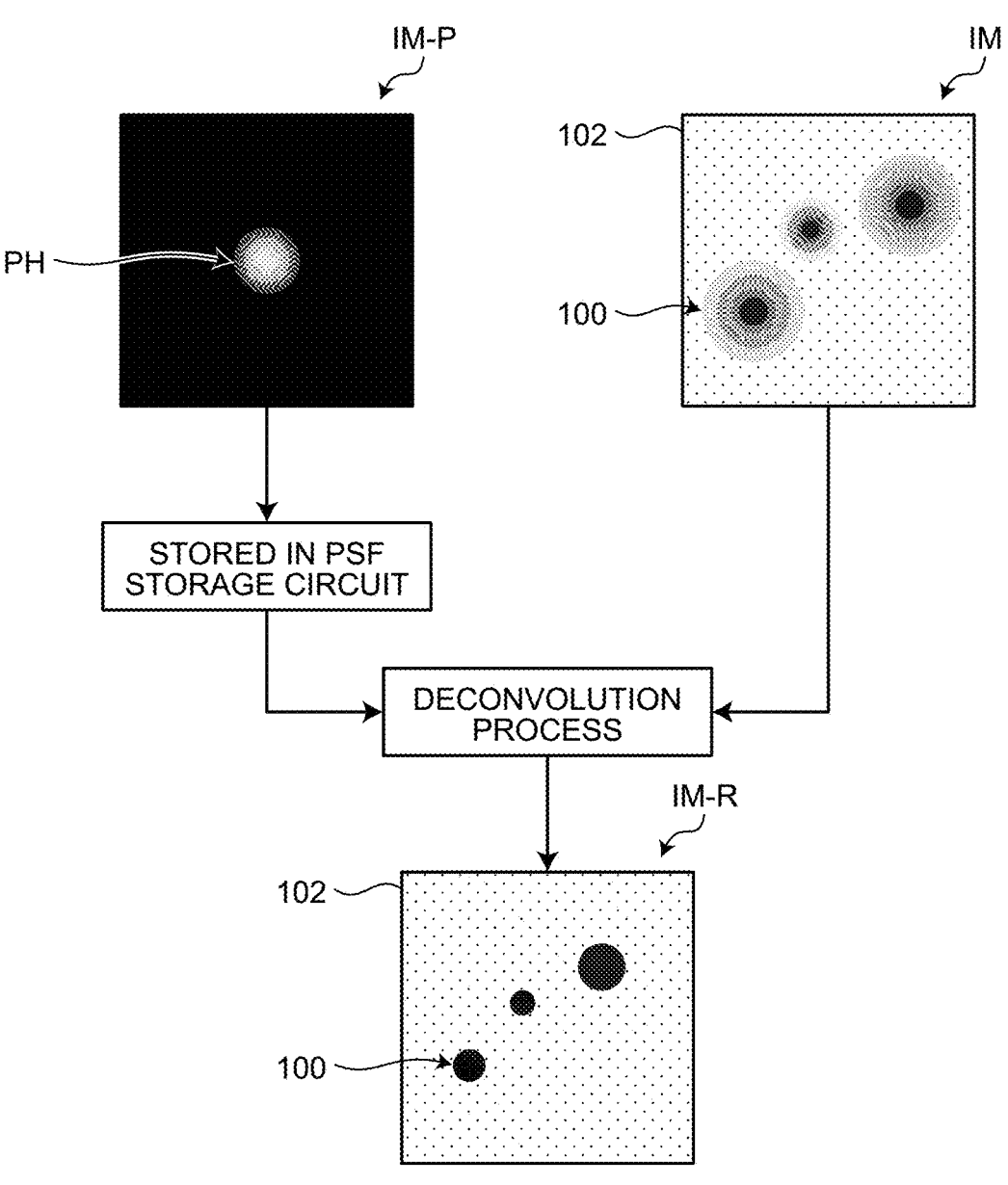
FIG. 7 is an explanatory diagram for schematically explaining a method to generate a restored image of an image obtained by imaging objects to be detected, using a deconvolution process.
Figure 8:
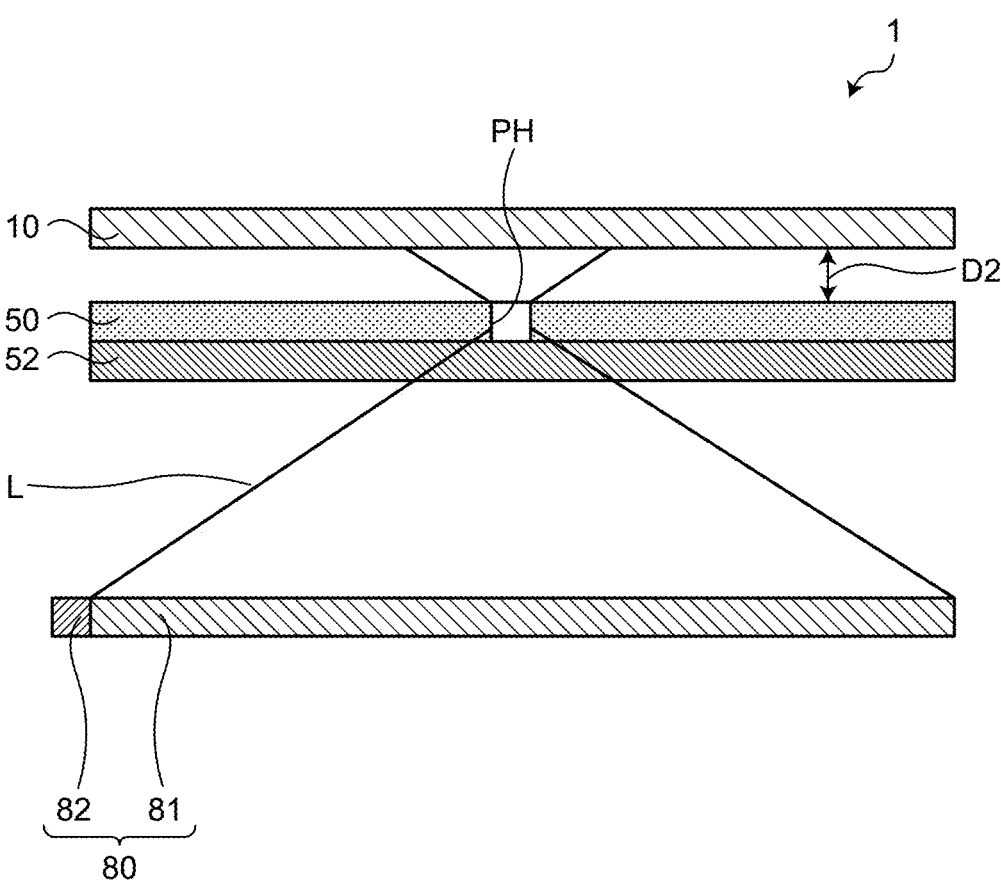
FIG. 8 is a sectional view for schematically explaining a method to acquire point spread function (PSF) data by the detection device according to the first embodiment.
Figure 9:
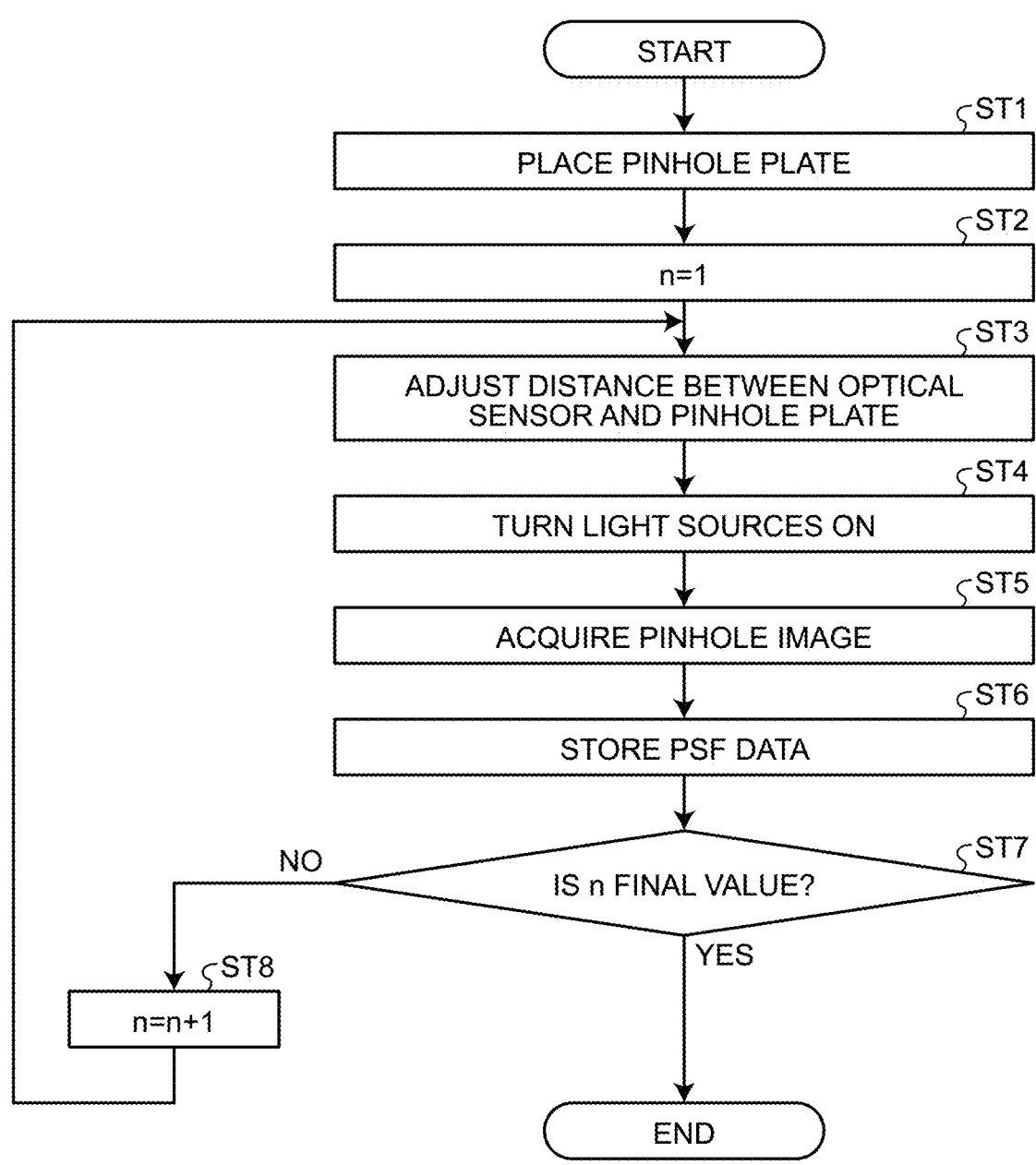
FIG. 9 is a flowchart illustrating the method to acquire the PSF data by the detection device according to the first embodiment.

The following describes an exemplary detection method of the detection device 1 of the present embodiment. FIG. 7 is an explanatory diagram for schematically explaining a method to generate the restored image of the image obtained by imaging the objects to be detected, using the deconvolution process. FIG. 8 is a sectional view for schematically explaining a method to acquire the PSF data by the detection device according to the first embodiment. FIG. 9 is a flowchart illustrating the method to acquire the PSF data by the detection device according to the first embodiment. FIG. 10 is a flowchart illustrating the method to generate the restored image by the detection device according to the first embodiment.

First, the method to acquire the PSF data used for the deconvolution process will be described with reference to FIGS. 7 to 9. As illustrated in FIGS. 8 and 9, an operator places the pinhole plate 50 instead of the placement substrate 110 (objects to be detected 100 and culture medium 102) (Step ST1). The pinhole plate 50 is placed between the optical sensor 10 and the light source device 80. The pinhole plate 50 is a non-light-transmitting plate-like member provided with a pinhole PH that penetrates in the thickness direction. The pinhole PH is not limited in diameter and is formed, for example, to have substantially the same diameter as that of the object to be detected 100.

At Steps ST2 to ST7, the detection device 1 varies a distance D2(n) between the optical sensor 10 and the pinhole plate 50 in a direction orthogonal to a surface of the optical sensor 10 and acquires the PSF data for each value of the distance D2(n).

Specifically, the control circuit 70 sets the number of times n of imaging of the pinhole plate 50 to 1 (Step ST2). Each number of times n of imaging is associated with a corresponding value of the distance D2(n) between the optical sensor 10 and the pinhole plate 50. The maximum number (final value) of times n of imaging is set in advance depending on specifications of the detection device 1 (for example, the distance between the optical sensor 10 and the light source device 80) and the accuracy of restoration required for the deconvolution process to be described later.

Then, the distance D2(n) between the optical sensor 10 and the pinhole plate 50 is adjusted (Step ST3). As illustrated in FIG. 8, a spacer 52 is provided on the lower surface of the pinhole plate 50. For example, the distance D2(n) between the optical sensor 10 and the pinhole plate 50 can be adjusted by preparing a plurality of spacers 52 having different heights and selecting and placing the spacer 52 according to the distance D2(n).

The spacer 52 can be of any configuration as long as the distance between the optical sensor 10 and the pinhole plate 50 can be changed. The spacer 52 is not limited to the configuration provided between the lower surface of the pinhole plate 50 and the light source device 80, and may be provided between the upper surface of the pinhole plate 50 and the optical sensor 10. The present disclosure is not limited to the configuration for selecting a preferable one from among the spacers 52. The spacer 52 may have a structure adjustable in height.

The light source device 80 turns on the light sources 82 based on the control signals from the control circuit 70 (Step ST4). This operation causes the light source device 80 to emit the planar light L. The light L is transmitted through the pinhole PH of the pinhole plate 50 and irradiated onto the photodiodes 30 of the optical sensor 10. The image of the pinhole PH projected on the surface of the optical sensor 10 has been spread with respect to the actual shape (area) of the pinhole PH.

The detection device 1 acquires the image IM-P of the pinhole plate 50 based on the light L (Step ST5). Specifically, the optical sensor 10 captures an image of the pinhole plate 50 based on the light L and transmits the pixel data Cap to the control circuit 70. The image generation circuit 72 of the control circuit 70 generates the image IM-P of the pinhole plate 50 based on the pixel data Cap transmitted from the optical sensor 10.

Then, the control circuit 70 stores a luminance distribution of the image IM-P of the pinhole plate 50 as the PSF data (spread function) in the PSF storage circuit 73 (Step ST6). In more detail, as illustrated in the left diagram of FIG. 7, the image IM-P of the pinhole plate 50 captured by the optical sensor 10 has the luminance distribution where the luminance is higher (brighter) at the center of the pinhole PH and becomes lower (darker) with increasing distance from the center point of the pinhole PH. The PSF data is generated based on the luminance distribution of the image IM-P. In other words, the PSF data includes luminance gradient data that indicates the relation between the distance from the center point of the pinhole PH and the luminance.

The control circuit 70 then determines whether the number of times n of imaging is the final value (Step ST7). If the number of times n of imaging is not the final value (No at Step ST7), the control circuit 70 updates the number of times n of imaging of the pinhole plate 50 to n+1 (Step ST8).

The control circuit 70 performs the processes at Steps ST3 to ST6 described above to capture a plurality of the images IM-P of the pinhole plate 50 by changing the distance D2(n) between the optical sensor 10 and the pinhole plate 50. The control circuit 70 thereby stores a plurality of pieces of the PSF data in the PSF storage circuit 73 in association with the values of the distance D2(n) between the optical sensor 10 and the pinhole plate 50. That is, the maximum number (final value) of times n of imaging corresponds to the number of pieces of the PSF data If the number of times n of imaging is the final value (Yes at Step ST7), the control circuit 70 ends the acquisition of the PSF data.

The following describes a method to generate the restored image IM-R by performing the deconvolution process using the PSF data on the image IM obtained by imaging the objects to be detected 100, with reference to FIGS. 7 and 10. When capturing the image IM of the objects to be detected 100 and generating the restored image IM-R as illustrated in FIG. 10, the plurality of pieces of the PSF data are stored in advance in the PSF storage circuit 73 as described above.

As illustrated in FIG. 10, the operator sets (places) the placement substrate 110 containing the objects to be detected 100 and the culture medium 102 (Step ST11).

The operator then enters a distance D1 between the optical sensor 10 and the placement substrate 110 into the control circuit 70 (Step ST12). Specifically, the operator operates an electronic apparatus such as a personal computer coupled to the detection device 1 to enter the distance D1.

However, in the imaging of the objects to be detected 100, for example, in the initial state of the culture of the objects to be detected 100, the objects to be detected 100 (cells) may not have grown enough and may not be substantially allowed to be imaged. In the following description, the term "objects to be detected 100" includes at least either the objects to be detected 100 or the culture medium 102, or both. The term "image IM of the objects to be detected 100"

includes the "image IM of at least either the objects to be detected 100 or the culture medium 102, or both".

The distance D1 between the optical sensor 10 and the placement substrate 110 is the distance D1 between the objects to be detected 100 and the optical sensor 10 in the direction orthogonal to the surface of the optical sensor 10, as illustrated in FIG. 1. Alternatively, when the surface of the culture medium 102 is regarded as the reference surface of the objects to be detected 100, the distance D1 is substantially equal to the "distance between the reference surface of the objects to be detected 100 (surface of the culture medium 102) and the optical sensor 10". In FIG. 1, the reference surface of the objects to be detected 100 and the culture medium 102 is located on the light source device 80 (light source 82) side of the bottom of the placement substrate 110.

Then, the light source device 80 turns on the light sources 82 based on the control signals from the control circuit 70 (Step ST13). This operation causes the light source device 80 to emit the planar light L. The light L is transmitted through the placement substrate 110 (including the objects to be detected 100 and the culture medium 102) and irradiated onto the photodiodes 30 of the optical sensor 10. The image of the objects to be detected 100 projected on the surface of the optical sensor 10 has been spread with respect to the actual shapes (areas) of the objects to be detected 100.

Then, the detection device 1 acquires the image IM of the objects to be detected 100 based on the light L (Step ST14). More specifically, the optical sensor 10 scans the photodiodes 30 on the entire surface of the detection area AA. The photodiodes 30 each output the detection signal Vdet corresponding to the amount of light irradiated thereto. The detection circuit 11 performs the signal processing on the detection signals Vdet from the photodiodes 30 and outputs the pixel data Cap. The image generation circuit 72 of the control circuit 70 generates the image IM of the objects to be detected 100 based on a plurality of pieces of the pixel data Cap.

For example, three objects to be detected 100 are captured as the image IM illustrated in the right diagram of FIG. 7. Each of the three objects to be detected 100 has a luminance distribution (spread) corresponding to the projected image on the surface of the optical sensor 10. As illustrated in the right diagram of FIG. 7, the image IM of the object to be detected 100 captured by the optical sensor 10 has a luminance distribution where the luminance is lower (darker) at the center of the object to be detected 100 and becomes higher (brighter) with increasing distance from the center point of the object to be detected 100.

The image processing circuit 74 of the control circuit 70 acquires, from the PSF storage circuit 73, the PSF data corresponding to the distance D1 between the optical sensor 10 and the placement substrate 110 (Step ST15). That is, a plurality of pieces of the PSF data corresponding to the values of the distance D2($n$) between the optical sensor 10 and the pinhole plate 50 are stored in advance in the PSF storage circuit 73 (refer to Steps ST3 to ST7 in FIG. 9). The image processing circuit 74 compares the values of the distance D2($n$) between the optical sensor 10 and the pinhole plate 50 with the distance D1, and selects a value of the distance D2($n$) that matches or is closest to the distance D1 from among the values of the distance D2($n$). The image processing circuit 74 then acquires, from the PSF storage circuit 73, the PSF data corresponding to the selected value of the distance D2($n$) from among the pieces of the PSF data.

The image processing circuit 74 performs the deconvolution process on the image IM obtained by imaging the objects to be detected 100 using the PSF data to generate the restored image IM-R (Step ST16). Specifically, the image processing circuit 74 performs the deconvolution process based on the luminance gradient data included in the PSF data described above with reference to FIGS. 7 to 9.

At Step ST16, the image processing circuit 74 can perform the deconvolution process based on Expression (1) below, for example, using the Wiener filter.

$$X \approx \hat{X} = W \cdot Y \qquad (1)$$

In Expression (1), X denotes the Fourier transform of the restored image IM-R (image without blur); X-hat (X with a superscript ^) denotes an approximate solution of X; and Y denotes the Fourier transform of the image IM (image with blur) obtained by imaging the objects to be detected 100. W denotes the Wiener filter and is a function expressed by Expression (2) below.

$$W = \frac{H^*}{|H|^2 + \Gamma} \qquad (2)$$

In Expression (2), H denotes the Fourier transform of the PSF data (spread function); H* denotes the complex conjugate of H; and $\Gamma$ denotes a constant that depends on the S/N ratio of the pixel data Cap.

The image processing circuit 74 obtains X-hat (X with a superscript ^) based on Expressions (1) and (2) using the Wiener filter on the image IM of the objects to be detected 100. The image processing circuit 74 can obtain the restored image IM-R without blur by inverse Fourier transforming the X-hat (X with a superscript ^) thus obtained.

The control circuit 70 transmits the restored image IM-R to an external host integrated circuit (IC) (not illustrated) (Step ST17).

As described above, the detection device 1 of the present embodiment performs the deconvolution process using the PSF data on the image IM, wherein the PSF is obtained by imaging the pinhole plate 50, and the image IM is obtained by imaging the objects to be detected 100 using the optical sensor 10. This operation allows the detection device 1 to generate the restored image IM-R with reduced blur even when the objects to be detected 100 are imaged using the light source device 80 that is a planar light source. Therefore, the detection device 1 can improve the detection accuracy of the objects to be detected 100.

The method to acquire the PSF data and the deconvolution process illustrated in FIGS. 7 to 10 are only exemplary and can be changed as appropriate. For example, in FIG. 8, the PSF data may be acquired by providing the small light-blocking point instead of the pinhole plate 50. The small light-blocking point is located correspondingly to the pinhole PH of the pinhole plate 50.

The image obtained by imaging the small light-blocking point is an image obtained by inverting the luminance of the image IM-P of the pinhole plate 50 illustrated in FIG. 7. That is, the image IM-P of the small light-blocking point has a luminance distribution where the luminance is lower (darker) at the center of the small light-blocking point and becomes higher (brighter) with increasing distance from the center point of the small light-blocking point. The PSF data may include luminance gradient data that indicates the relation between the distance from the center point of the small light-blocking point and the luminance.

When using the PSF data based on the image IM-P of the small light-blocking point, the image processing circuit 74 of the control circuit 70 generates the restored image IM-R by performing the deconvolution process on the image IM obtained by imaging the objects to be detected 100, based on the inverted data of the luminance gradient data of the PSF data. As a result, even when the PSF data is acquired using the small light-blocking point instead of the pinhole plate 50, the restored image IM-R with reduced blur can be generated in the same way as the case described above with reference to FIGS. 7 to 10.

Modification

Figure 11:
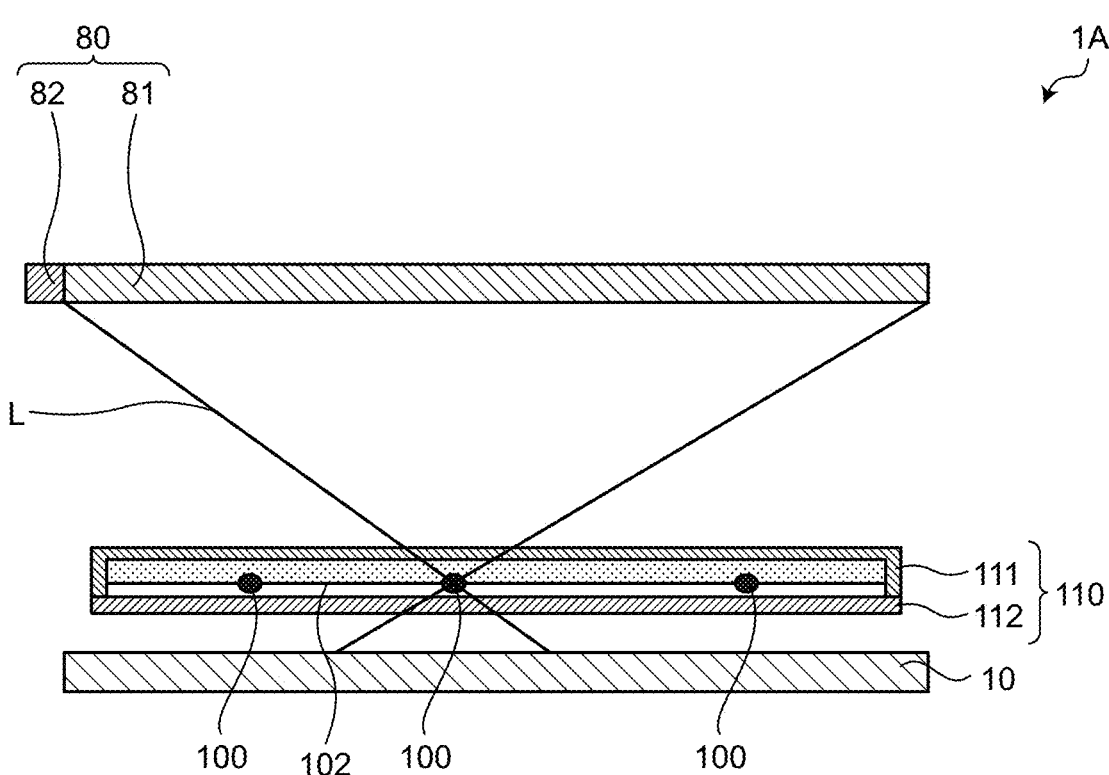
FIG. 11 is a sectional view schematically illustrating a detection device according to a modification.

FIG. 11 is a sectional view schematically illustrating a detection device according to a modification. In the following description, the same components as those described in the embodiment described above are denoted by the same reference numerals, and the description thereof will not be repeated.

In the first embodiment described above, the configuration has been described in which the light source device 80, the placement substrate 110 (objects to be detected 100 and culture medium 102), and the optical sensor 10 are arranged in this order, but the configuration is not limited thereto. As illustrated in FIG. 11, in a detection device 1A according to the modification, the optical sensor 10, the placement substrate 110 (objects to be detected 100 and culture medium 102), and the light source device 80 are arranged in this order.

The configuration of each of the optical sensor 10, the placement substrate 110 (objects to be detected 100 and culture medium 102), and the light source device 80 is the same as that in the first embodiment described above. However, the placement substrate 110 is placed with the container body 111 on the upper side (light source device 80 side) and the cover member 112 on the lower side (optical sensor 10 side). That is, in the detection device 1A according to the modification, the reference surface of the objects to be detected 100 and the culture medium 102 is located on the optical sensor 10 side of the bottom of the placement substrate 110.

Second Embodiment

Figure 12:
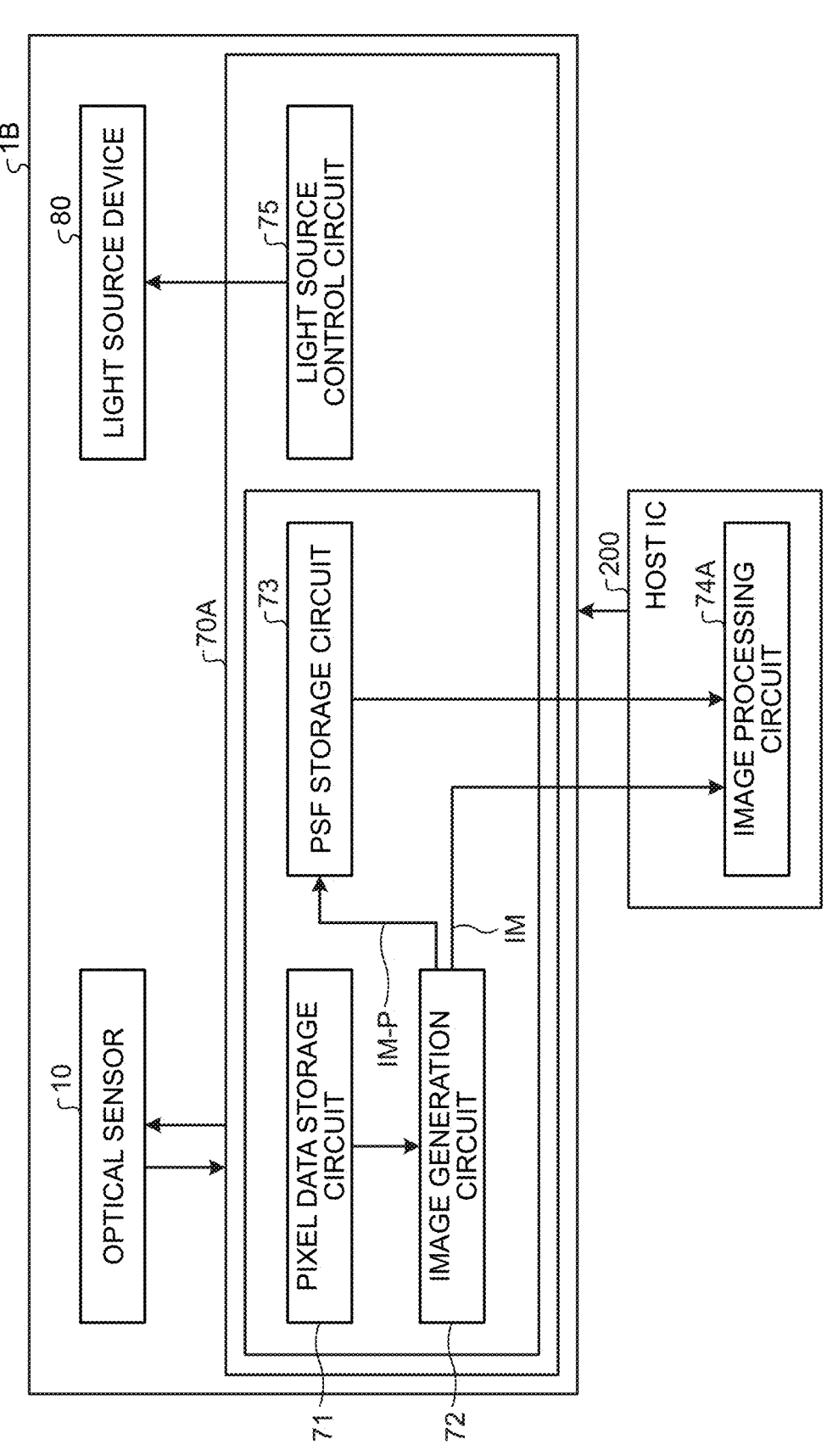
FIG. 12 is a block diagram illustrating a configuration example of a detection system according to a second embodiment.

FIG. 12 is a block diagram illustrating a configuration example of a detection system according to a second embodiment. In the first embodiment described above, the example has been illustrated in which the control circuit 70 including the MCU performs the deconvolution process to generate the restored image IM-R, but the present disclosure is not limited to this example.

As illustrated in FIG. 12, the detection system according to the second embodiment includes a detection device 1B and a host IC 200. The host IC 200 is a control circuit included in an electronic apparatus such as a personal computer.

In the second embodiment, the host IC 200 includes an image processing circuit 74A that performs the deconvolution process on the image IM. That is, the host IC 200 receives the image IM, which is obtained by imaging the objects to be detected 100, and the PSF data from the detection device 1B. Then, the image processing circuit 74A of the host IC 200 generates the restored image IM-R by performing the deconvolution process using the PSF data on the image IM obtained by imaging the objects to be detected 100.

In the present embodiment, a control circuit 70A of the detection device 1B does not include the image processing circuit 74A. Therefore, the circuit size of the control circuit 70A can be reduced compared with the first embodiment described above.

In the example illustrated in FIG. 12, the control circuit 70A of the detection device 1B includes the PSF storage circuit 73, but the host IC 200 may include the PSF storage circuit 73. In FIG. 12, one detection device 1B is coupled to one host IC 200, but the present disclosure is not limited to this configuration. A plurality of the detection devices 1B may be coupled in parallel to one host IC 200.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omission, substitution, and change of the components can be made without departing from the gist of the embodiments and the modification described above.

What is claimed is:

1. A detection device comprising:
a light source;
an optical sensor comprising a plurality of photodiodes configured to output pixel data corresponding to amounts of light received by the photodiodes;
a light-transmitting placement substrate that is configured to be placed between the light source and the optical sensor and comprises a portion configured to have an object to be detected placed thereon;
a storage circuit configured to store point spread function (PSF) data corresponding to a luminance gradient based on a positional relation between the light source and the object to be detected; and
a control circuit configured to generate a restored image by performing a deconvolution process using the PSF data on an image obtained by imaging the object to be detected using the optical sensor based on light from the light source, wherein
the PSF data is data acquired based on an image obtained by placing a pinhole plate or a small light-blocking point instead of the placement substrate and by imaging the pinhole plate or the small light-blocking point using the optical sensor based on the light from the light source,
the PSF data comprises luminance gradient data indicating a relation between a distance from a center point of the pinhole plate and luminance, and
the control circuit is configured to generate the restored image by performing the deconvolution process on the image obtained by imaging the object to be detected based on the luminance gradient data of the PSF data.

2. A detection device comprising:
a light source;
an optical sensor comprising a plurality of photodiodes configured to output pixel data corresponding to amounts of light received by the photodiodes;
a light-transmitting placement substrate that is configured to be placed between the light source and the optical sensor and comprises a portion configured to have an object to be detected placed thereon;
a storage circuit configured to store point spread function (PSF) data corresponding to a luminance gradient based on a positional relation between the light source and the object to be detected; and a control circuit configured to generate a restored image by performing a deconvolution process using the PSF data on an image obtained by imaging the object to be detected using the optical sensor based on light from the light source, wherein the PSF data is data acquired based on an image obtained by placing a pinhole plate or a small light-blocking point instead of the placement substrate and by imaging the pinhole plate or the small light-blocking point using the optical sensor based on the light from the light source, the PSF data comprises luminance gradient data indicating a relation between a distance from a center point of the pinhole plate or the small light-blocking point and luminance, and the PSF data is stored in advance in the storage circuit.

3. The detection device according to claim 1, wherein a plurality of pieces of the PSF data are stored correspondingly to a distance between the optical sensor and the pinhole plate or the small light-blocking point in a direction orthogonal to the optical sensor, and the control circuit is configured to select the PSF data based on a distance between the optical sensor and the object to be detected in the direction orthogonal to the optical sensor.

4. A detection device comprising:

a light source;

an optical sensor comprising a plurality of photodiodes configured to output pixel data corresponding to amounts of light received by the photodiodes;

a light-transmitting placement substrate that is configured to be placed between the light source and the optical sensor and comprises a portion configured to have an object to be detected placed thereon;

a storage circuit configured to store point spread function (PSF) data corresponding to a luminance gradient based on a positional relation between the light source and the object to be detected; and a control circuit configured to generate a restored image by performing a deconvolution process using the PSF data on an image obtained by imaging the object to be detected using the optical sensor based on light from the light source, wherein the PSF data is data acquired based on an image obtained by placing a pinhole plate or a small light-blocking point instead of the placement substrate and by imaging the pinhole plate or the small light-blocking point using the optical sensor based on the light from the light source, the PSF data comprises luminance gradient data indicating a relation between a distance from a center point of the small light-blocking point and luminance, and the control circuit is configured to generate the restored image by performing the deconvolution process on the image obtained by imaging the object to be detected based on inverted data of the luminance gradient data of the PSF data.

5. The detection device according to claim 1, wherein the control circuit is a micro control unit (MCU).

6. The detection device according to claim 1, wherein the placement substrate comprises a container body configured to contain the object to be detected and a cover member configured to cover the container body, and a reference surface of the object to be detected is located on a light source side of a bottom of the container body.

7. The detection device according to claim 1, wherein the placement substrate comprises a container body configured to contain the object to be detected and a cover member configured to cover the container body, and a reference surface of the object to be detected is located on an optical sensor side of a bottom of the container body.

8. A detection system comprising:

the detection device of claim 1; and a host integrated circuit (IC) configured to perform image processing on an image captured by the detection device, wherein the host IC is configured to generate a restored image by performing a deconvolution process using the PSF data on the image received from the detection device, the image having been obtained by imaging the object to be detected.

9. A detection system comprising:

the detection device of claim 2; and a host integrated circuit (IC) configured to perform image processing on an image captured by the detection device, wherein the host IC is configured to generate a restored image by performing a deconvolution process using the PSF data on the image received from the detection device, the image having been obtained by imaging the object to be detected.

10. A detection system comprising:

the detection device of claim 4; and a host integrated circuit (IC) configured to perform image processing on an image captured by the detection device, wherein the host IC is configured to generate a restored image by performing a deconvolution process using the PSF data on the image received from the detection device, the image having been obtained by imaging the object to be detected.

* * * * *